(12) United States Patent
Furutake et al.

(10) Patent No.: US 10,688,942 B2
(45) Date of Patent: Jun. 23, 2020

(54) IMAGING DEVICE

(71) Applicant: DENSO CORPORATION, Kariya, Aichi-pref. (JP)

(72) Inventors: Yasuki Furutake, Kariya (JP); Nobuhisa Shimizu, Kariya (JP); Takeshi Kazama, Kariya (JP); Takayuki Kimura, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 0 days.

(21) Appl. No.: 16/426,272

(22) Filed: May 30, 2019

(65) Prior Publication Data

US 2019/0366942 A1 Dec. 5, 2019

(30) Foreign Application Priority Data

Jun. 1, 2018 (JP) .................................. 2018-106188

(51) Int. Cl.
*B60R 11/04* (2006.01)
*B60R 11/00* (2006.01)

(52) U.S. Cl.
CPC ....... *B60R 11/04* (2013.01); *B60R 2011/0026* (2013.01); *B60R 2300/80* (2013.01)

(58) Field of Classification Search
None
See application file for complete search history.

(56) References Cited

U.S. PATENT DOCUMENTS

| 8,570,374 | B2* | 10/2013 | Betham | B60R 11/04 348/148 |
| 2005/0232469 | A1* | 10/2005 | Schofield | B60R 1/12 382/104 |
| 2012/0207461 | A1 | 8/2012 | Okuda | |
| 2013/0194425 | A1* | 8/2013 | Schofield | B60R 1/04 348/148 |
| 2015/0015713 | A1* | 1/2015 | Wang | H04N 5/235 348/148 |
| 2016/0091714 | A1* | 3/2016 | Hui | H04N 5/2251 359/512 |
| 2016/0167595 | A1* | 6/2016 | Kang | B60R 11/04 348/148 |
| 2017/0070652 | A1* | 3/2017 | Muller | B60R 11/04 |
| 2017/0293199 | A1* | 10/2017 | Kim | H04N 7/183 |

FOREIGN PATENT DOCUMENTS

JP 2012166615 A 9/2012

* cited by examiner

*Primary Examiner* — William B Perkey
(74) *Attorney, Agent, or Firm* — Maschoff Brennan

(57) ABSTRACT

In an imaging device mounted in the interior of a vehicle, a camera module is arranged so as to image the area ahead of the vehicle via a windshield. A processing substrate is provided integrally with the camera module and includes a processing part that controls the camera module. When the side on which an incident light receiving face exists in the camera module is defined as camera front and the side opposite to the camera front is defined as camera rear, the whole processing substrate is arranged at the camera rear with respect to the camera module.

7 Claims, 5 Drawing Sheets

IMAGING DEVICE

CROSS-REFERENCE TO RELATED APPLICATION

This application is based on and claims the benefit of priority from earlier Japanese Patent Application No. 2018-106188 filed Jun. 1, 2018, the description of which is incorporated herein by reference.

BACKGROUND

Technical Field

The present disclosure relates to an imaging device.

Related Art

A known imaging device images the area ahead of a vehicle and is provided with a camera module, a processing substrate, and a hood. The hood is a plate-like member which is arranged below a lens portion of the camera module and toward the front of the vehicle and prevents excess light such as light reflected by a bonnet of the vehicle or the like from being incident on a light receiving face of the camera module. The processing substrate is mounted with a CPU which controls the camera module and a memory, and is arranged along a lower part of the hood.

The imaging device of this type is arranged between a rearview mirror and a windshield so as not to interrupt the driver's visual recognition of the area ahead of the vehicle through the windshield.

An electronic mirror, which is a display for displaying an image captured by an imaging device for imaging the periphery of a vehicle, is known.

DESCRIPTION OF SPECIFIC EMBODIMENTS

Figure 1:
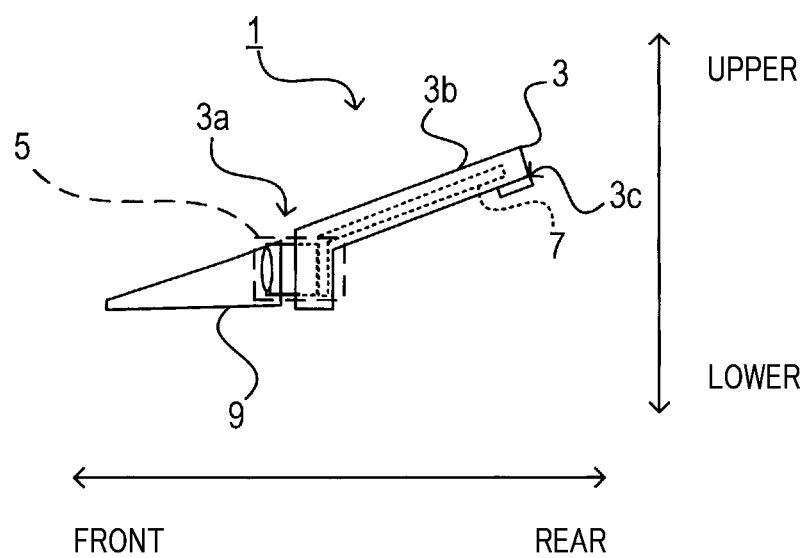
FIG. 1 is a diagram illustrating the structure of an imaging device.
Figure 2:
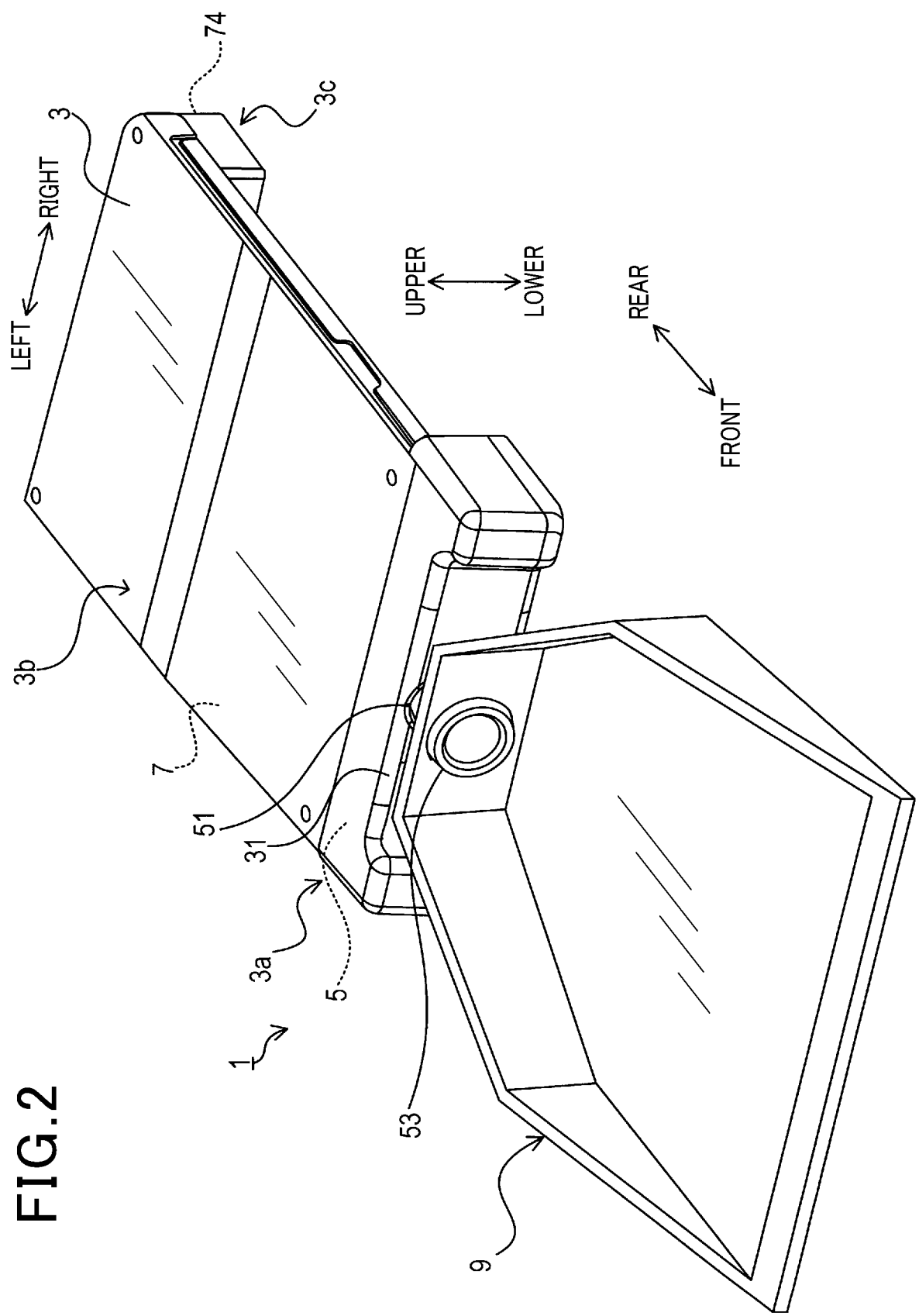
FIG. 2 is a perspective view illustrating the overall structure of the imaging device diagonally from the front.
Figure 3:
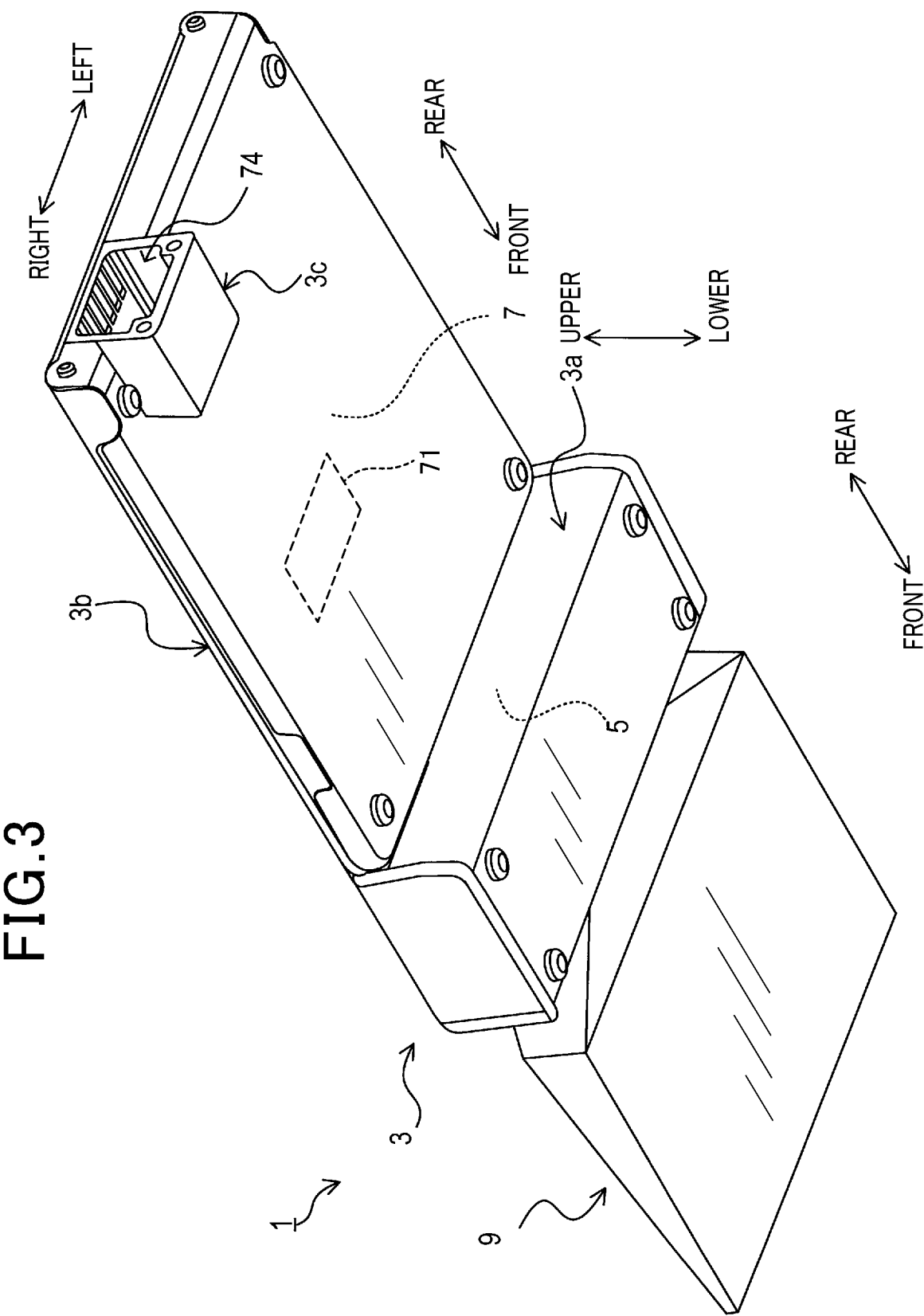
FIG. 3 is a diagram illustrating the overall structure of the imaging device diagonally from the rear.

In the case where an electronic mirror is used in place of a rearview mirror, when a driver turns his/her eyes from the front of a vehicle to an image displayed on a display part of the electronic mirror, a burden is imposed on the driver's eyes since an object existing ahead of the vehicle and the image displayed on the display part of the electronic mirror are greatly different in distance from the driver to the target to be watched. The display part of the electronic mirror is a light emitting display, and thus imposes a burden on the driver's eyes when the electronic mirror is positioned near the driver.

On the other hand, when an electronic mirror and an imaging device are positioned further from a driver's seat, to alleviate the burden on the driver's eyes, in a positional relationship in which the electronic mirror is arranged closer to the driver's seat than the imaging device, such positioning prevents the driver from viewing the area ahead of the vehicle through the windshield, thereby worsening the visibility of the area ahead of the vehicle.

If the electronic mirror is arranged in a lower part of the imaging device so as to be positioned away from the imaging device while the imaging device has a conventional structure, casings for the imaging device and the electronic mirror will be bulky due to the presence of the processing substrate arranged in the lower part of the imaging device. So, there is a possibility that the imaging device cannot be arranged at a position where it can image the front through the windshield. Further, the imaging device and the electronic mirror may prevent the driver from viewing the area ahead of the vehicle.

It is therefore desired to have a technique concerning an imaging device which attains both the visibility of an electronic mirror and the visibility of the area ahead of a vehicle when the electronic mirror is installed in place of a rearview mirror.

Hereinafter, exemplary embodiments of the present disclosure will be described in detail with reference to the accompanying drawings, in which like reference numerals refer to like or similar elements regardless of reference numerals and duplicated description thereof will be omitted.

1. Configuration

The configuration of an imaging device 1 will be described based on FIG. 1 to FIG. 4. The imaging device 1 is an in-vehicle camera which is installed inside a windshield 100 of a vehicle and images the area ahead of the vehicle. In the following description, the upper-and-lower (vertical) direction of each member of the imaging device 1 is defined as the vertical direction of the member in a state where the imaging device 1 is installed inside the windshield 100.

The imaging device 1 is provided with a casing 3, a camera module 5, a processing substrate 7, and a hood 9, as shown in FIG. 1. The casing 3 has a main body part 3a, a substrate part 3b, and a connector part 3c.

The main body part 3a has a lens hole 31 which makes the interior of the casing 3 and the external communicate with each other. The main body part 3a accommodates the camera module 5 in a state where a part thereof is externally exposed from the lens hole 31. Here, the front-and-rear direction is defined as follows. The direction in which a part of the camera module 5 is exposed from the lens hole 31 is defined as front, and the direction opposite thereto is defined as rear. Also, the right-and-left direction when the imaging device 1 is viewed from the front direction is defined as the right-and-left direction referred to herein. The imaging device 1 is normally attached to a vehicle so that the front direction and the traveling direction of the vehicle coincide with each other.

The substrate part 3b forms a space for accommodating the processing substrate 7 at the rear of the main body part 3a. The upper face of the substrate part 3b is formed in a rectangular shape for accommodating the processing substrate 7, and covers the processing substrate 7. The upper face of the substrate part 3b is formed of a highly light blocking material which blocks light such as sunlight. The upper face of the substrate part 3b is not limited to the case where the material therefor itself is a highly light blocking material, and may be applied with a highly light blocking coating material.

The connector part 3c is formed at the rear of the substrate part 3b, and forms a space for accommodating components such as various connectors. The connector part 3c is opened toward the rear, and forms a space for accommodating an input/output connector 74.

The spaces formed by the main body part 3a and the substrate part 3b are configured to communicate with each other.

Figure 4:
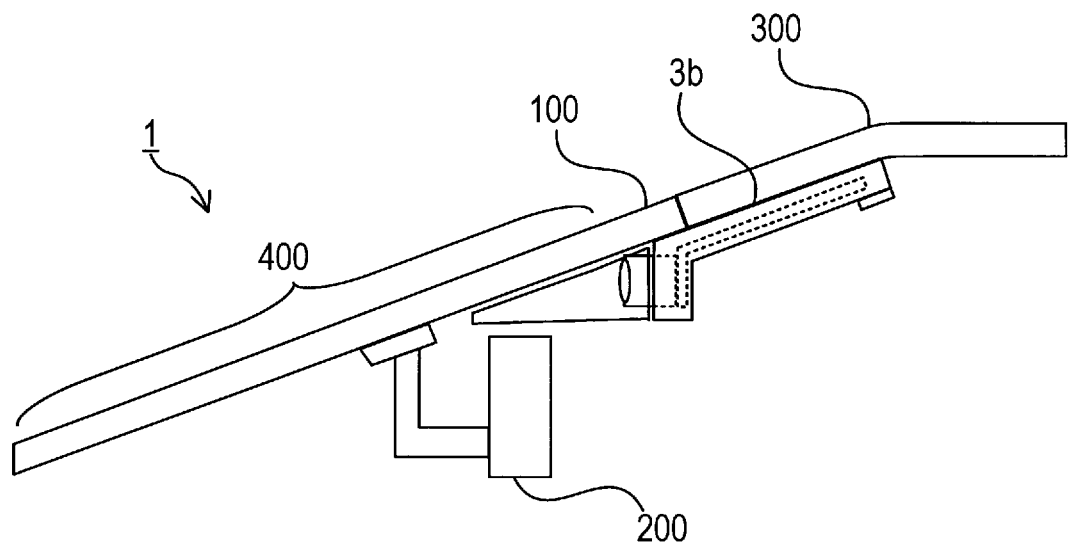
FIG. 4 is an illustration of installation of the imaging device.

Further, when the imaging device 1 is installed in a vehicle, the casing 3 of the imaging device 1 including the substrate part 3b is formed in a shape along the internal shape of a roof portion 300, as shown in FIG. 4. The roof portion 300 refers to a portion of the roof of the vehicle which is positioned near the boundary with the windshield 100. The imaging device 1 is installed so that an imaging range of the imaging device 1 falls within a wiper range 400 which is a range wiped by a wiper which wipes a surface of the windshield 100.

2. Camera Module

The camera module 5 is housed in the main body part 3a, and is accommodated within the main body part 3a so that a lens 53 retained by a lens barrel part 51 is externally exposed from the lens hole 31 formed in the main body part 3a. The camera module 5 converts a captured image into an image signal, and outputs the converted image signal to the processing substrate 7 using an imaging-side connector.

3. Processing Substrate

The processing substrate 7 acquires the image signal from the camera module 5 using a processing-side connector, processes the image signal in an image processing circuit provided on the processing substrate, and outputs the processed image signal from an external connector.

More specifically, the processing substrate 7 is provided integrally with the camera module 5 and includes a processing part 71 (see FIG. 3) that controls the camera module. The processing part 71 performs processing for acquiring an image signal from the camera module and outputting an image signal obtained by processing the image signal to the external. The processing part 71 performs processing for controlling a light exposure state during imaging by an imager provided in the camera module. The processing part 71 performs processing for image-recognizing an obstacle and a structure within an imaging range based on the image captured by the camera module.

The external connector is connected to the input/output connector 74 accommodated in the connector part 3c, inputs an instruction from the external to the image processing circuit from the input/output connector 74, and outputs the image signal processed in the image processing circuit to the input/output connector 74.

The connection between the imaging-side connector and the processing-side connector and the connection between the external connector and the input/output connector 74 are established, for example, by a flexible printed substrate.

4. Hood

The hood 9 is a plate-like member formed at the front of the main body part 3a, and prevents light from the lower side from being incident on the lens 53 of the camera module 5. The hood 9 is not required to accommodate a substrate such as the processing substrate 7 therein, and thus may be formed thin so long as it can block light. The hood 9 may also be detachably joined to the main body part 3.

5. Advantages

The embodiment described in detail above provides the following advantages.

(5a) According to the above-described embodiment, the processing substrate 7 is arranged at the rear of the camera module 5. Therefore, it is not necessary to install the processing substrate 7 in a lower part of the camera module 5.

As a result, even if an electronic mirror 200 is arranged at a position further from the driver's seat than the imaging device 1 as shown in FIG. 4, it is possible to decrease the vertical distance between the imaging device 1 and the electronic mirror 200. Therefore, it is possible to prevent the electronic mirror 200 from interfering with the driver's view of the area ahead of the vehicle.

Thus, when the electronic mirror 200 is installed in place of the rearview mirror, it is possible to attain both the visibility of the electronic mirror 200 and the visibility of the area ahead of the vehicle.

(5b) According to the above-described embodiment, the imaging device 1 is formed in a shape along the internal shape of the roof portion 300. Therefore, the imaging device 1 can be arranged closer to the internal shape of the roof portion 300. This makes it possible to further suppress the imaging device 1 from interfering with the vehicle driver's view of the area ahead of the vehicle through the windshield 100.

(5c) Also, the imaging device 1 is installed so that the imaging range of the imaging device 1 falls within the wiper range 400 which is a range wiped by the wiper which wipes a surface of the windshield 100, thereby making it possible to suppress disturbance of a video image captured by the imaging device 1 due to rain.

(5d) According to the above-described embodiment, sunlight transmitted through the windshield 100 can be blocked by the upper face portion of the substrate part 3b. This can prevent a failure of the processing substrate 7 due to sunlight itself or heat generated upon exposure to sunlight.

In summary, one aspect of the present disclosure provides an imaging device (1) mounted in the interior of a vehicle. The imaging device includes a camera module (5) arranged so as to image the area ahead of the vehicle via a windshield (100), and a processing substrate (7) provided integrally with the camera module and including a processing part (71) that controls the camera module. In the imaging device, when the side on which an incident light receiving face exists in the camera module is defined as camera front and the side opposite to the camera front is defined as camera rear, the whole processing substrate is arranged at the camera rear with respect to the camera module.

According to such a configuration, the processing substrate of the imaging device is installed at the rear of the camera module, thereby eliminating the necessity for the processing substrate to be arranged in a lower part of a hood, whereby an electronic mirror can be arranged in the lower part of the hood.

This makes it possible to decrease a vertical distance between the imaging device and the electronic mirror as compared with a structure in which the processing substrate is arranged below the camera module.

Thus, when an electronic mirror is installed in place of a rearview mirror, it is possible to attain both the visibility of the electronic mirror and the visibility of the area ahead of a vehicle.

6. Modifications

The embodiment of the present disclosure has been described above, but the present disclosure is not limited to the above-described embodiment, and can be implemented with various modifications.

Figure 5:
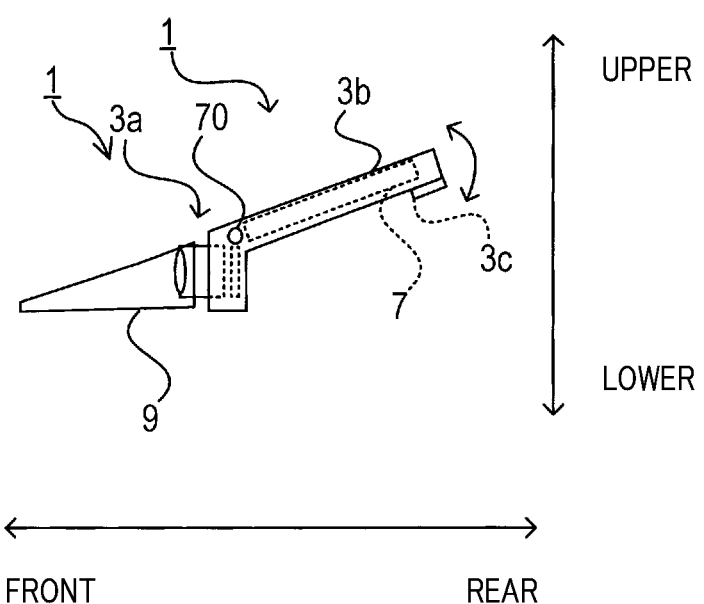
FIG. 5 is a diagram illustrating the structure of an imaging device in a variation.

(6a) In the above-described embodiment, the casing 3 having the main body part 3a, the connector part 3c and the substrate part 3b is configured as an integrated body, but is not limited to the configuration in which these parts are provided integrally. For example, the substrate part 3*b* may be configured as a separate body. When the substrate part 3*b* of the casing 3 is configured as a separate body, and the main body part 3*a* and the substrate part 3*b* are connected by flexible wiring such as a flexible printed substrate, the substrate part 3*b* may be connected to the main body part 3*a* by a hinge 70 so that an end part of the substrate part 3*b* moves vertically as shown in FIG. 5. Since such a configuration makes it possible to change the installation angle of the substrate part 3*b* according to the shape of the interior of the vehicle, the imaging device 1 can be installed in various vehicles.

(6b) In the above-described embodiment, the present disclosure is applied to an imaging device composed of a so-called monocular camera provided with only one camera module 5, but is not limited thereto. For example, the present disclosure may be applied to an imaging device composed of a so-called stereo camera provided with two camera modules 5.

Figure 6:
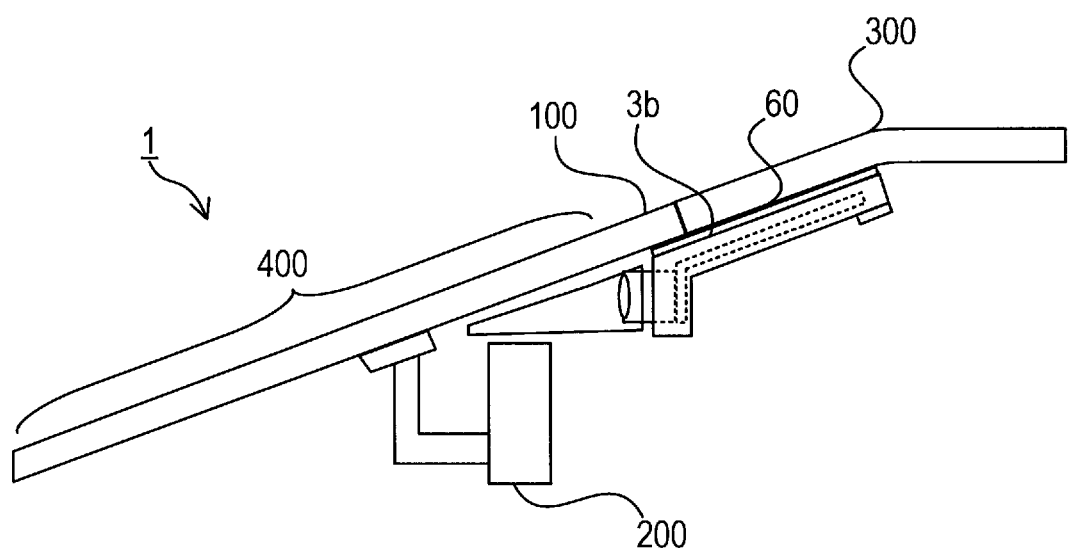
FIG. 6 is an illustration of installation of the imaging device in the variation.

(6c) In the above-described embodiment, the upper face of the substrate part 3*b* is formed of a highly light blocking material which blocks light such as sunlight. However, a light blocking plate 60 may be provided as a separate body, apart from the upper face of the substrate part 3*b*, as shown in FIG. 6. In that case, the light blocking plate 60 may be formed in a shape along the body of the vehicle. The upper face of the substrate part 3*b* and the light blocking plate 60 correspond to the configuration as a light blocking part.

(6d) In the above-embodiment, the upper face of the substrate part 3*b* or the light blocking plate functions as the light blocking part, but the light blocking part is not necessarily required. For example, the light blocking part is not necessarily required when sunlight to which the processing substrate 7 is exposed is blocked by the roof portion 300.

(6e) A plurality of functions provided by one component in the above-described embodiment may be realized by a plurality of components, or one function provided by one component may be realized by a plurality of components. Also, a plurality of functions provided by a plurality of components may be realized by one component, or one function realized by a plurality of components may be realized by one component. Also, a part of the configuration of the above-described embodiment may be omitted. Also, at least a part of the configuration of the above-described embodiment may be added to or replaced with any other configuration of the above-described embodiment. All aspects falling within the technical idea specified from the wording of the claims are embodiments of the present disclosure.

What is claimed is:

1. An imaging device mounted in the interior of a vehicle, comprising:
    a camera module arranged so as to image the area ahead of the vehicle via a windshield; and
    a processing substrate provided integrally with the camera module and including a processing part that controls the camera module,
    wherein, when the side on which an incident light receiving face exists in the camera module is defined as camera front and the side opposite to the camera front is defined as camera rear, the whole processing substrate is arranged at the camera rear with respect to the camera module.

2. The imaging device according to claim 1, wherein the processing part performs processing for acquiring an image signal from the camera module and externally outputting an image signal obtained by processing the image signal.

3. The imaging device according to claim 1, wherein the processing part performs processing for controlling a light exposure state at the time of imaging by an imager provided in the camera module.

4. The imaging device according claim 1, wherein the processing part performs processing for image-recognizing an obstacle and a structure within an imaging range based on the image captured by the camera module.

5. The imaging device according to claim 1, wherein the imaging device, when attached to the inside of the windshield, has a shape along the internal shape of the body of the vehicle, and further comprises a light blocking part which blocks light incident on the processing substrate via the windshield.

6. The imaging device according to claim 1, wherein a hood which blocks light incident from a lower part of the camera module is arranged at the camera front of and below the camera module.

7. The imaging device according to claim 6, wherein an electronic mirror is arranged in the lower part of the hood.

* * * * *